Patented Mar. 25, 1947

2,417,939

UNITED STATES PATENT OFFICE 2,417,939

PURIFICATION OF SULFONAMIDE DERIVATIVES

Erwin Kuh, New Brunswick, Leonard H. Dhein, Bound Brook, and Robert H. Ebel, Martinsville, N. J., assignors to American Cyanamid Company, New York, N. Y., a corporation of Maine No Drawing. Application November 1, 1945, Serial No. 626,180

6 Claims. (Cl. 260—239.6)

This invention relates to the purification of organic chemical compounds. More particularly, it relates to the purification of those compounds susceptible to oxidation to colored products, having pKa values of 2 to 12, of which aqueous alkaline solutions of the product or an alkali salt thereof can be prepared and of which the alkaline-earth-metal salts are water-soluble. Still more particularly it is concerned with the purification of those aminosulfonamides, aminocarboxylic acids, aminosulfonic acids, aminophenols and thiols which are stable in aqueous alkaline solution.

Purification of these various organic compounds for the production of drugs and dyestuff intermediates, has become an important operation. Particularly is this true in the medicinal field in which the product must not only have a purity of recognized standards so far as chemical identity and melting point are concerned, but must also meet definite color standards.

Unfortunately by the very nature of many of the reactants and the procedural steps through which the various materials are taken traces of color varying from light yellow to rust color are extremely difficult to avoid. These may be due to various causes of which traces of colored oxidized products and salts of such products is one of the most troublesome. From whatever the origin, the presence of these colored impurities necessitates further purification in order that the final product may meet the accepted standards.

In the past it has been customary to carry out the necessary purification by recrystallization from suitable solvents. This procedure is always undesirable if it can be avoided. It involves losses of economy in manufacture through the expense of the solvent per se and of the losses of potential product entailed in the recrystallizing operation itself. There remains, therefore, a demand for a purification process which will produce a product meeting the accepted standards as to color without being subject to the objectionable characteristics of the solvent recrystallization.

It is, therefore, the object of the present invention to produce a purification process suitable for treatment of various chemical compounds and in particular those dye and drug intermediates and compounds which in the process of preparation have become slightly contaminated with colored materials which appear to be oxidation products or salts of such products. It is a further object of the present invention to devise a process which is not subject to the known difficulties of solvent recrystallization. It is a still further object to produce such a process which is simple, effective and economical in operation.

In general, the objects of the invention are quite simply and easily obtained. An aqueous alkaline solution of the material containing the objectionable colored impurities is prepared. To this is added a material capable of furnishing alkaline-earth metal ions, usually a small amount of a water-soluble alkline-earth metal oxide or hydroxide. Further addition thereto of an alkali metal dithionite (hydrosulfite), followed by heating and agitation results in reduction of the colored oxidized impurities, oxidation of the dithionite and in the precipitation of an alkaline-earth metal sulfite. On clarification of the mixture as by treatment with decolorizing carbon and filtering, a clear, water-white solution is obtained. From the latter the desired product is readily precipitated by acidification in a form sufficiently white to be acceptable as a product for medicinal purposes.

While the exact mechanism whereby the invention accomplishes the desired result is not fully understood, a possible explanation is that the dithionite reduces the colored products to leuco forms and these are coprecipitated with the alkaline-earth sulfite and removed by the clarification operation. If the use of alkaline-earth ions is dispensed with, the leuco forms of the colored impurities remain and are very rapidly reoxidized in the presence of oxygen.

In dissolving the crude material it is necessary that the resultant solution have a fairly high pH, usually in the range from 9.0–10.5. Maintaining this alkaline pH requires an excess of alkali. Under such conditions the dissolved product, if capable of forming an alkali metal salt, is in that form. It therefore makes little difference whether the material to be dissolved is a free base or is in the form of an alkali or alkaline-earth metal salt. This is of advantage in many cases, as in the preparation of sulfonamide derivatives, since many common procedures usually involve an alkaline hydrolysis in which the sodium salt is formed.

Since an essential feature of the present invention is the precipitation and removal of an alkaline-earth metal sulfite along with objectionable matter, it is necessary that alkaline-earth metal ions be present in the solution to be clarified. This is readily done by using a water-soluble alkaline-earth metal oxide or hydroxide as a part of the alkaline material used to maintain the pH at the desired figure. Any alkaline-earth metal of which the sulfite is insoluble under operating conditions may be used. However, for reasons of practical economy and availability probably only the calcium salts are of any practical importance. The magnesium sulfite is somewhat too soluble, but strontium or barium may be used.

Having the material to be purified in a solution of excess alkalinity and containing alkaline-earth metal ions, the sulfite of the latter is then prepared in situ. This is done by adding a water-soluble alkali dithionite. The process is not necessarily limited to the use of any particular hydrosulfite but in practice sodium dithionite is found to be preferable. Formation of the alkaline-earth metal sulfite being much more rapid at elevated temperatures and the flocculation being also more effective in carrying down the objectionable material which favors formation of colored impurities, the mixture is usually next boiled for a short length of time to precipitate all of the sulfite. In connection with the latter, it is desirable that the amount of alkaline-earth metal ions available be approximately the amount required or in slight excess thereover to insure complete removal of the hydrosulfite.

After formation of the alkaline-earth metal sulfite precipitate, its removal is readily effected. The preferable procedure is that of cooling slightly, adding a decolorizing carbon to the mixture, stirring for a short time, and filtering the resultant mixture.

The invention will be illustrated in conjunction with the following examples which are intended by way of illustration only and not by way of limitation. All parts are by weight unless otherwise noted.

EXAMPLE 1

2-sulfanilamido-4-methylpyrimidine (sulfamerazine)

Sufficient 2 - (N$^4$-acetylsulfanilamido) -4-methylpyrimidine was hydrolyzed with a slight excess of sodium hydroxide to produce the equivalent of 100 parts of 2-sulfanilamido-4-methylpyrimidine in about 1000 parts of water. The excess alkalinity was reduced to a pH of about 9.0–9.5 with hydrochloric acid after which sufficient calcium hydroxide was added to raise the pH to 10.0 to 10.5. The temperature of the solution was raised to about 95° C. and 0.5 part of sodium dithionite was added. The solution was brought to boil and maintained at that point for about ten minutes. Thereafter the temperature was dropped to 90° C. When the solution was treated with about 10 parts of activated charcoal, clarified, then acidified with acetic acid to a pH of 4.0 to 5.5, the resultant precipitate of 2-sulfanilamido - 4 - methylpyrimidine was whiter than medically acceptable standards.

It should be noted that it makes little difference at what stage in the preparation of the product the purification process of the present invention is employed. In the manufacture of 4-methyl-2-sulfanilamidopyrimidine, for example, an equally satisfactory product is obtained whether the present process is carried out before the sodium acetyl salt is hydrolyzed and hydrolysis is subsequently carried out on the purified acetylsulfanilamido derivative or whether the hydrolysis first is carried to completion and the sulfanilamido derivative so obtained is purified by the process of the present invention. This is shown by a comparison of the preceding and the following examples.

EXAMPLE 2

2-sulfanilamido-4-methylpyrimidine

To 1000 parts of water were added 100 parts of crude 2-(N$^4$-acetylsulfanilamido)-4-methylpyrimidine and sufficient sodium hydroxide to produce a pH of from 10.0–10.5. The temperature was raised to 90° C. and 0.3 part of sodium dithionite added, after which the temperature was brought to the boil and there maintained for about 10 minutes. The temperature was then dropped to 90° C., 10 parts of activated charcoal added, and the mixture stirred for 15 minutes. Clarification of the resultant mixture produced a water-white solution. To this filtrate was added sufficient acetic acid to produce a pH of about 4.0 to 5.5 which precipitated purified 2-(N$^4$ - acetylsulfanilamido) -4-methylpyrimidine as a white powder. Hydrolysis of this product with sodium hydroxide followed by acidification of the hydrolysis product to a pH of 4.0 to 5.5 yielded a 2 - sulfanilamido-4-methylpyrimidine whiter than the accepted standards.

EXAMPLE 3

2-sulfanilamidopyrimidine (sulfadiazine)

100 parts of slightly yellow 2-sulfanilamidopyrimidine was added to 1000 parts of water with sufficient sodium hydroxide to produce a pH from 10.0 to 10.5. Temperature was raised to 90° C. and 0.2 part of sodium dithionite was added. The temperature was then raised to 95° C., 0.5 part of calcium hydroxide added thereto, the solution brought to a boil and maintained there for 10 minutes. The temperature was then lowered to 90° C., 10 parts of activated charcoal added, the mixture stirred for about 10 minutes and clarified. The resultant clear, water-white solution was acidified to a pH of 4.0 to 5.5 with acetic acid. The resultant precipitate of 2-sulfanilamidopyrimidine was whiter than the accepted standards.

EXAMPLE 4

2-sulfanilamidopyrimidine

In order to show that the order of adding the dithionite and the alkaline-earth metal is not critical, 100 parts of slightly yellow 2-sulfanilamidopyrimidine was added to 1000 parts of water, then sufficient calcium hydroxide was added to give a pH from 10.0 to 10.5. The temperature was raised to 90° C. and 0.2 part of sodium dithionite was added. The temperature was then raised to the boiling point and maintained 10 minutes. The temperature was lowered to 90° C., 10 parts of activated charcoal was added, the mixture was stirred for about 10 minutes and clarified. The resultant clear, water-white solution was acidified to a pH of 4.0 to 5.5 with acetic acid. A precipitate of 2-sulfanilamindopyrimidine was obtained which was whiter than the accepted standards.

EXAMPLE 5

2-thio-4-hydroxypyrimidine (thiouracil)

75 parts of crude 2-thio-4-hydroxypyrimidine was slurried in 500 parts water. Sodium hydroxide was added to a pH of 10.0–10.5. The solution was heated to 90° C. and 0.5 part sodium dithionite added, then heated to 95° C. and 0.5 part calcium hydroxide added. The suspension was boiled, cooled somewhat and 5 parts of activated charcoal added. After stirring 15 minutes the solution was clarified by filtration and 2-thio-4-hydroxypyrimidine precipitated there-from at 80° C. by the addition of 33% acetic acid to a pH of 4.0-5.5. After cooling to 25° C. the 2-thio-4-hydroxypyrimidine was filtered and dried. A finished product as white as the accepted standard was obtained.

EXAMPLE 6
2-sulfanilamidopyrazine (sulfapyrazine)

56 parts of crude 2-sulfanilamidopyrazine were suspended in 500 cc. warm water. Sodium hydroxide was added to a pH of 10.0-10.5. Then hydrochloric acid was added to a pH of 9.0-9.5; calcium hydroxide was added to a pH of 10.0-10.5 and the solution heated to 90° C. To this was added 0.6 part sodium dithionite and the solution was boiled for 10 minutes. After cooling to 90° C. 5.6 parts activated charcoal were added and stirred for 15 minutes. After clarifying the solution, 2-sulfanilamidopyrazine was precipitated from the filtrate by the addition of acetic acid to a pH of 4.0 to 5.5, giving a practically colorless product.

EXAMPLE 7
2-sulfanilamidothiazole (sulfathiazole)

After hydrolyzing 2-($N^4$-acetylsulfanilamido)-thiazole with sodium hydroxide, a solution, containing 300 parts real 2-sulfanilamido-thiazole, was neutralized to a pH of 9.0-9.5, with hydrochloric acid. The volume was increased to 3000 cc. by the addition of water. Enough calcium hydroxide was added to raise the pH to 10.0-10.5. The suspension was then heated to 95° C. and 3.0 parts sodium dithionite were added. After boiling for 10 minutes, the temperature was dropped to 90° C. and 30 parts of activated charcoal were added. After stirring 15 minutes, the solution was clarified and the 2-sulfanilamidothiazole was precipitated from the water-white solution with acetic acid. The 2-sulfanilamidothiazole recovered was whiter than accepted standards.

EXAMPLE 8
2-sulfanilamido-4,6-dimethylpyrimidine (sulfamethazine)

To 2000 parts of water were added 167 parts of crude 2 - sulfanilamido-4,6-dimethylpyrimidine. Enough sodium hydroxide was added to raise the pH to 10.0-10.5. To the solution was then added 4 parts calcium hydroxide. The solution was heated to a boil. At 95° C. 2 parts sodium dithionite were added. After boiling 5 minutes, 16.7 parts decolorizing carbon were added. After stirring 15 minutes, at 90° C., the solution was filtered and neutralized with acetic acid to a pH of 4.0 to 5.5 to precipitate the 2-sulfanilamido-4,6-dimethylpyrimidine. A product whiter than accepted standards was obtained.

EXAMPLE 9
5-chloro-2-metanilamidopyrimidine

To 1000 parts of water were added 100 parts of crude, slightly yellow 5-chloro-2-metanilamido-pyrimidine and sufficient sodium hydroxide to produce a pH of 9.0 to 9.5. Calcium hydroxide was then added sufficient to raise the pH to 10.0 to 10.5. The temperature was raised to 90° C. and 0.8 part of sodium dithionite was added, after which the temperature was raised to the boiling point and maintained for 10 minutes. After cooling to 90° C., 10 parts of activated charcoal was added and the mixture agitated for 10 minutes. The mixture was clarified and a water-white solution was obtained from which a white product was precipitated by acidifying with acetic and hydrochloric acids to a pH of approximately 4.5. After washing and drying the product was whiter than an acceptable standard.

While most of these illustrative examples have been concerned with the purification of aminobenzenesulfonamides monosubstituted on the amide nitrogen, the invention is not necessarily so limited. It may be employed advantageously in purifying many organic compounds which are contaminated with their colored oxidized derivatives or salts thereof. However, it is only applicable within certain limits. The compounds or their alkali metal or alkaline-earth metal salts must be water-soluble in solutions of relatively high pH (9–11 for example), they must be weakly acidic and their pKa values (logarithm of the reciprocal of their dissociation constants, as commonly designated Ka) must in general be within the range of from about 4 to 9. However, in some cases the latter may be as low as about 2.0–2.5 or may be as high as about 12. A further restriction is that the colored impurities must be capable of reduction to colorless products in an alkaline solution of a dithionite. A list of representative compounds from classes to which the present invention is applicable may be summarized as follows:

| Compound | pKa |
| --- | --- |
| p-Aminophenol | 8.18 |
| o-Aminophenol | 9.66 |
| Sulfanilic Acid | 3.21 |
| Metanilic Acid | 3.73 |
| Orthanilic Acid | 2.48 |
| Tyrosine | 8.40 |
| 1-Aminonaphthalene-4-sulfonic Acid | 2.32 |
| 1-Aminonaphthalene-5-sulfonic Acid | 3.62 |
| 1-Aminonaphthalene-6-sulfonic Acid | 3.71 |
| 1-Aminonaphthalene-7-sulfonic Acid | 3.63 |
| 1-Aminonaphthalene-8-sulfonic Acid | 4.99 |
| 2-Aminonaphthalene-5-sulfonic Acid | 4.03 |
| 2-Aminonaphthalene-7-sulfonic Acid | 3.99 |
| 2-Aminonaphthalene-8-sulfonic Acid | 3.91 |
| p-Aminobenzoic Acid | 4.68 |
| Thiouracil | 7.89 |
| $N^1$-2-Hydroxyethylsulfanilamide | 10.92 |
| Sulfapyridine | 8.43 |
| 4,6-Dimethyl-2-sulfanilamidopyrimidine | 7.37 |
| 4-Methyl-2-sulfanilamidopyrimidine | 7.06 |
| Sulfadiazine | 6.48 |
| Sulfapyrazine | 6.04 |
| $N^1$-Acetylsulfanilamide | 5.38 |
| 2-Sulfanilamido-1,3,4-thiadiazole | 4.77 |
| Disulfanilamide | 2.89 |
| 2-Metanilamido-5-chloropyrimidine | 5.50 |
| Sulfanilamide | 10.43 |

We claim:

1. In the purification of weakly acidic organic chemicals, having pKa values in the range of 2–12 and capable of forming water-soluble alkaline-earth metal salts, from mixtures with colored oxidized impurities, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated, and clarifying the resultant mixture.

2. In the purification of weakly acidic organic chemicals, selected from the group consisting of aminobenzene sulfonamides monosubstituted on the amide nitrogen, having pKa values in the range of 2.6–11.0 and capable of forming water-soluble alkaline-earth metal salts, from mixtures with colored oxidized impurities, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated.

3. In the purification of weakly acidic substituted pyrimidines, having pKa values in the range of 6-8 and capable of forming water-soluble alkaline-earth metal salts, from mixtures with colored oxidation products thereof, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated, and clarifying the resultant mixture.

4. In the purification of 2-sulfanilamidopyrimidine from mixtures with colored oxidation products thereof, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated, and clarifying the resultant mixture.

5. In the purification of 4-methyl-2-sulfanilamidopyrimidine from mixtures with colored oxidation products thereof, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated, and clarifying the resultant mixture.

6. In the purification of 2-thio-4-hydroxypyrimidine from mixtures with colored oxidation products thereof, the improvement which comprises dissolving the material in aqueous alkaline solution, adding thereto a material capable of furnishing free alkaline-earth metal ions, adding a water-soluble alkali dithionite, heating and agitating the mixture, whereby the objectionable colored impurities are reduced and an alkaline-earth metal sulfite is precipitated, and clarifying the resultant mixture.

ERWIN KUH.
LEONARD H. DHEIN.
ROBERT H. EBEL.